(12) United States Patent
Sotirelis et al.

(10) Patent No.: US 9,824,786 B2
(45) Date of Patent: Nov. 21, 2017

(54) COMPACT PARTICLE SENSOR

(71) Applicant: The Johns Hopkins University, Baltimore, MD (US)

(72) Inventors: Thomas S. Sotirelis, Ellicott City, MD (US); G. Bruce Andrews, Ellicott City, MD (US)

(73) Assignee: The Johns Hopkins University, Baltimore, MD (US)

(*) Notice: Subject to any disclaimer, the term of this patent is extended or adjusted under 35 U.S.C. 154(b) by 166 days.

(21) Appl. No.: 14/795,538

(22) Filed: Jul. 9, 2015

(65) Prior Publication Data
US 2016/0189921 A1    Jun. 30, 2016

Related U.S. Application Data

(60) Provisional application No. 62/022,693, filed on Jul. 10, 2014.

(51) Int. Cl.
*G01T 1/24* (2006.01)
*G21K 1/02* (2006.01)
*G01T 1/29* (2006.01)
*G01T 1/36* (2006.01)

(52) U.S. Cl.
CPC ............ *G21K 1/02* (2013.01); *G01T 1/2907* (2013.01); *G01T 1/36* (2013.01)

(58) Field of Classification Search
CPC .......... G21K 1/02; G01T 1/00; G01T 1/2907; G01T 1/36

USPC ............................................. 250/370.01, 392
See application file for complete search history.

(56) References Cited

U.S. PATENT DOCUMENTS

| | | | | |
|---|---|---|---|---|
| 2002/0154865 A1* | 10/2002 | Lasecki | ................. | G02B 6/327 |
| | | | | 385/52 |
| 2006/0033029 A1* | 2/2006 | Popper | .................... | G01T 1/242 |
| | | | | 250/370.01 |

OTHER PUBLICATIONS

Wesolek et al. "Micro Processing a Path to agreesive Instrument Miniaturization for Micro and Picosats", IEEE Aerospace Conference, Mar. 5-12, 2005.*

* cited by examiner

*Primary Examiner* — David Porta
*Assistant Examiner* — Meenakshi Sahu
(74) *Attorney, Agent, or Firm* — Sung T. Kim

(57) ABSTRACT

An energy sensor is provided including a collimator comprising a plurality of sensor apertures aligned in a plurality of directions configured to allow passage of an energetic particle or photon in a specific direction for respective apertures of the plurality of sensor apertures and at least one energy detector configured to measure the energetic particle or photon including a plurality of detector segments. Respective detector segments of the plurality of detector segments are aligned with the respective sensor apertures and a detector segment which measures the energetic particle or photon is indicative of a directionality of the energetic particle or photon.

16 Claims, 12 Drawing Sheets

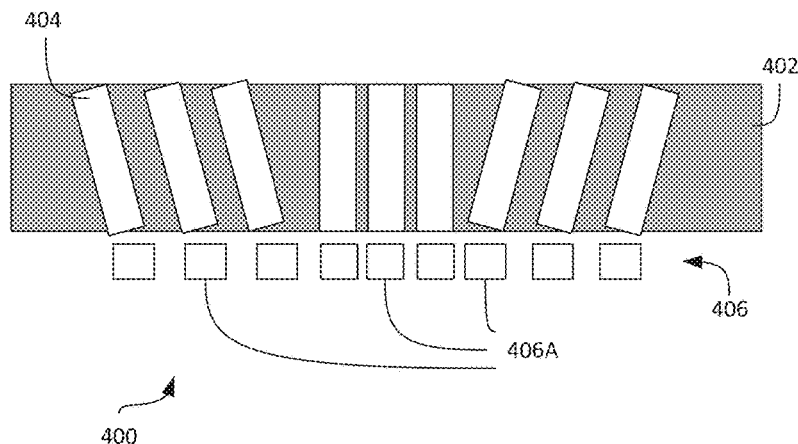
Figure 5B
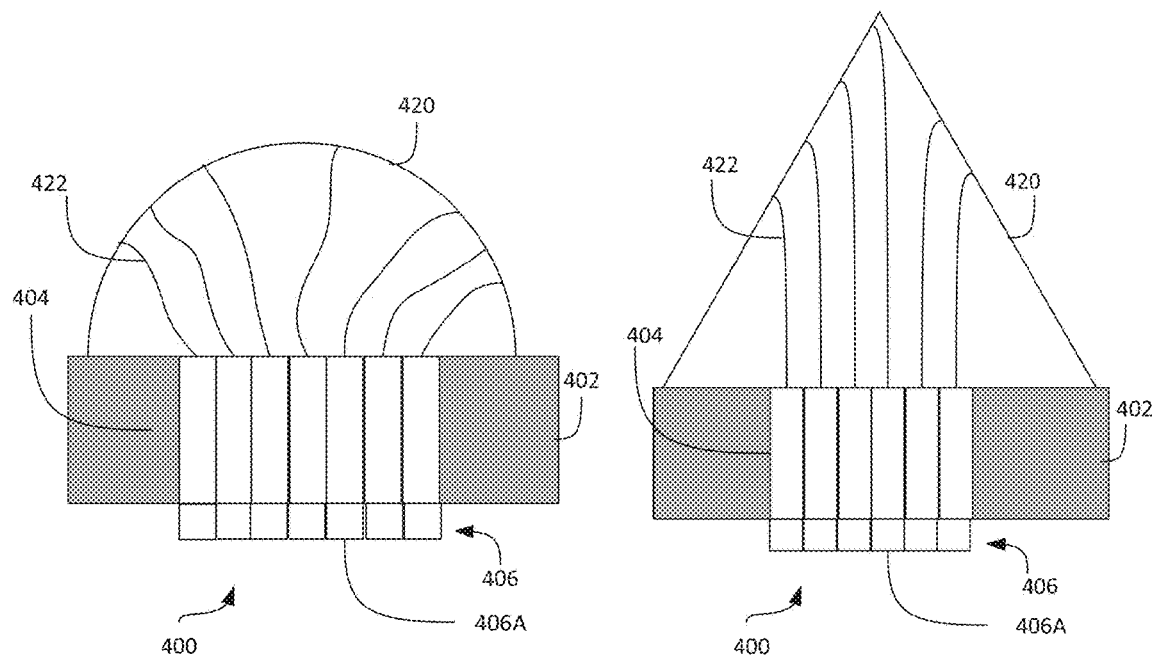
Figure 5C
Figure 5D

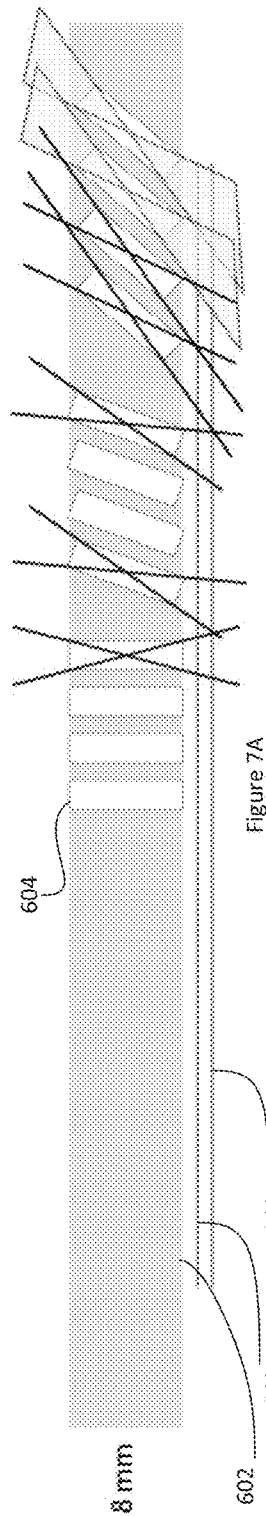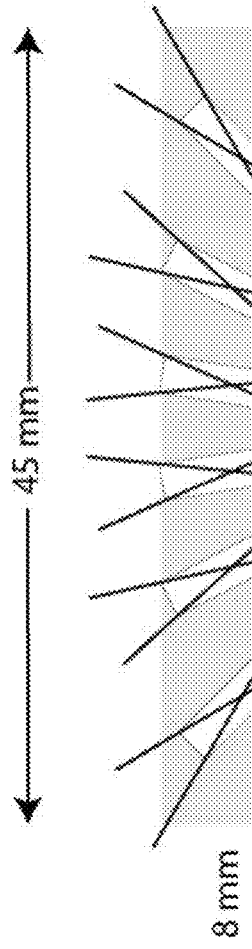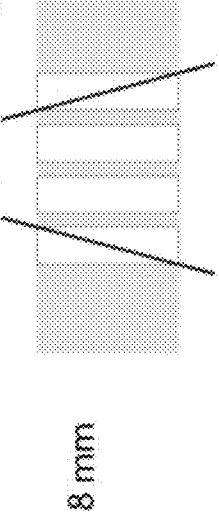

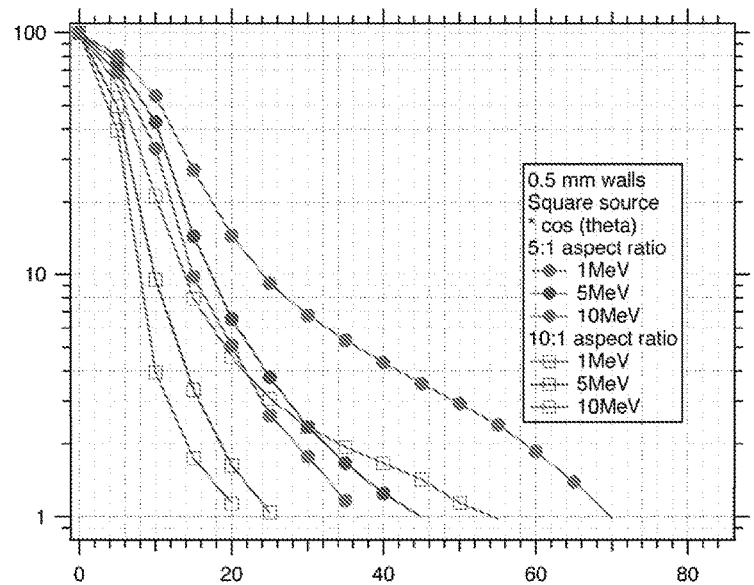
Figure 8
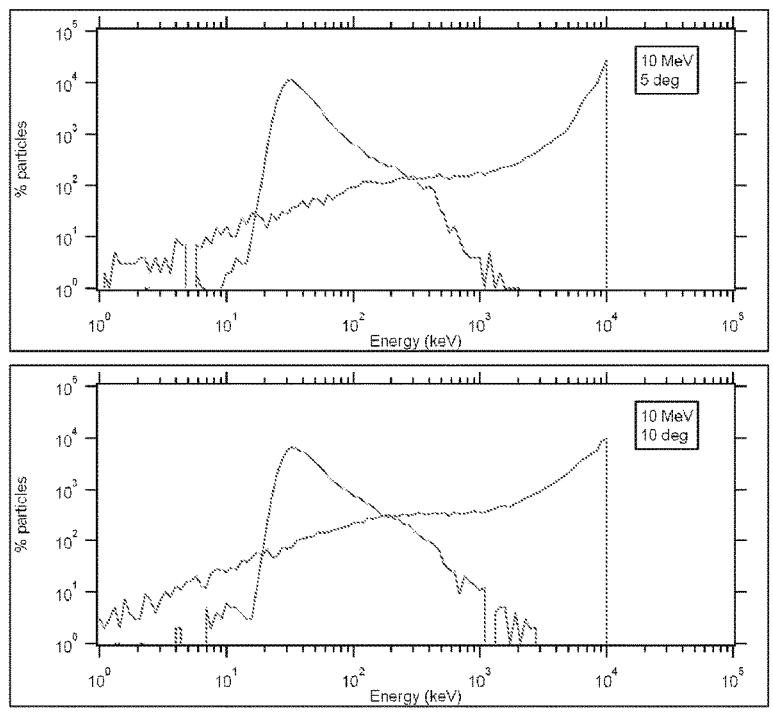

COMPACT PARTICLE SENSOR

CROSS REFERENCE TO RELATED APPLICATIONS

This application claims the benefit of U.S. Provisional Application No. 62/022,693 filed on Jul. 10, 2014, the entire contents of which are hereby incorporated herein by reference.

TECHNICAL FIELD

The instant disclosure generally relates to particle sensors and, in particular, to a compact particle sensor.

BACKGROUND

Typical energetic particle sensors may utilize a tubular collimator for assessment of energy particle directionality. Each tubular collimator may be 30-100 millimeters in length and provides a single look-direction, or field-of-view. Since a separate tubular collimator is necessary for each field of view, multi-directional particle sensors may be bulky in both mass and size. Additionally, typical particle sensors may utilize separate sensors for each collimator, which may in turn, necessitate redundant sensor electronics.

BRIEF SUMMARY OF SOME EXAMPLES

The instant disclosure is directed to a compact particle sensor, as described below. In one example embodiment, an energy sensor is provided including a collimator including a plurality of sensor apertures aligned in a plurality of directions configured to allow passage of an energetic particle or photon in a specific direction for respective apertures of the plurality of sensor apertures and at least one energy detector configured to measure the energetic particle or photon comprising a plurality of detector segments. Respective detector segments of the plurality of detector segments are aligned with the respective sensor apertures and a detector segment which measures the energetic particle or photon is indicative of a directionality of the energetic particle or photon.

In another example embodiment, an energy sensor is provided including a plurality of optical fibers or particle tubes configured to guide passage of an energetic particle or a photon from a receiving end to a discharge end. Respective receiving ends of respective optical fibers or particle tubes of the plurality of optical fibers or particle tubes are aligned in a plurality of directions, a collimator including a plurality of sensor apertures configured to allow passage of the energetic particle or photon. Respective discharge ends of the respective optical fibers or particle tubes are aligned with respective sensor apertures, and at least one energy detector configured to measure the energetic particle or photon including a plurality of detector segments. Respective detector segments of the plurality of detector segments are aligned with the respective sensor apertures and a detector segment which measures the energetic particle or photon is indicative of a directionality of the energetic particle or photon.

In yet another example embodiment, an energy sensor array is provided including a high energy sensor including a collimator including a plurality of sensor apertures aligned in a plurality of directions configured to allow passage of an energetic particle or photon in a specific direction for respective apertures of the plurality of sensor apertures and a first energy detector configured measure the energetic particle or photon including a plurality of detector segments. Respective detector segments of the plurality of detector segments are aligned with the respective sensor apertures and the respective detector segment which measures the energetic particle or photon is indicative of a directionality of the energetic particle or photon, a second energy detector configured to measure the energetic particle or photon. Measuring the energetic particle or photon at the second energy detector is indicative of the energetic particle or photon having an energy satisfying a predetermined nullification threshold. The high energy sensor also includes a third energy detector disposed between the first energy detector and the second energy detector configured to measure an energy level of the energetic particle or photon. The energy sensor array also includes a medium energy sensor including a second collimator including a second plurality of sensor apertures aligned in a second plurality of directions configured to allow passage of a second energetic particle or second photon in a second specific direction for respective apertures of the second plurality of sensor apertures, a fourth energy detector configured to measure the second energetic particle or second photon including a second plurality of detector segments, respective detector segments of the second plurality of detector segments are aligned with the respective second sensor apertures and the respective second detector segment which measures the second energetic particle or second photon is indicative of a second directionality of the second energetic particle or second photon, and a fifth energy detector configured to measure the second energetic particle or photon wave, measuring the second energetic particle or second photon at the fifth energy detector is indicative of the second energetic particle or second photon having an energy satisfying a second predetermined nullification threshold.

BRIEF DESCRIPTION OF THE SEVERAL VIEWS OF THE DRAWING(S)

Having thus described the particle sensor in general terms, reference will now be made to the accompanying drawings, which are not necessarily drawn to scale, and wherein:

FIGS. 5A-5D illustrate example collimator configurations according to an example embodiment of the particle sensor.

FIG. 7A illustrates an example collimator and sensor aperture construction of a high energy sensor according to an example embodiment of the particle sensor.

FIGS. 7B-7C illustrate example collimator and sensor aperture construction of a medium energy sensor according to an example embodiment of the particle sensor.

FIG. 8 illustrates example results of collimator simulations according to an example embodiment of the particle sensor.

DETAILED DESCRIPTION

Figure 1:
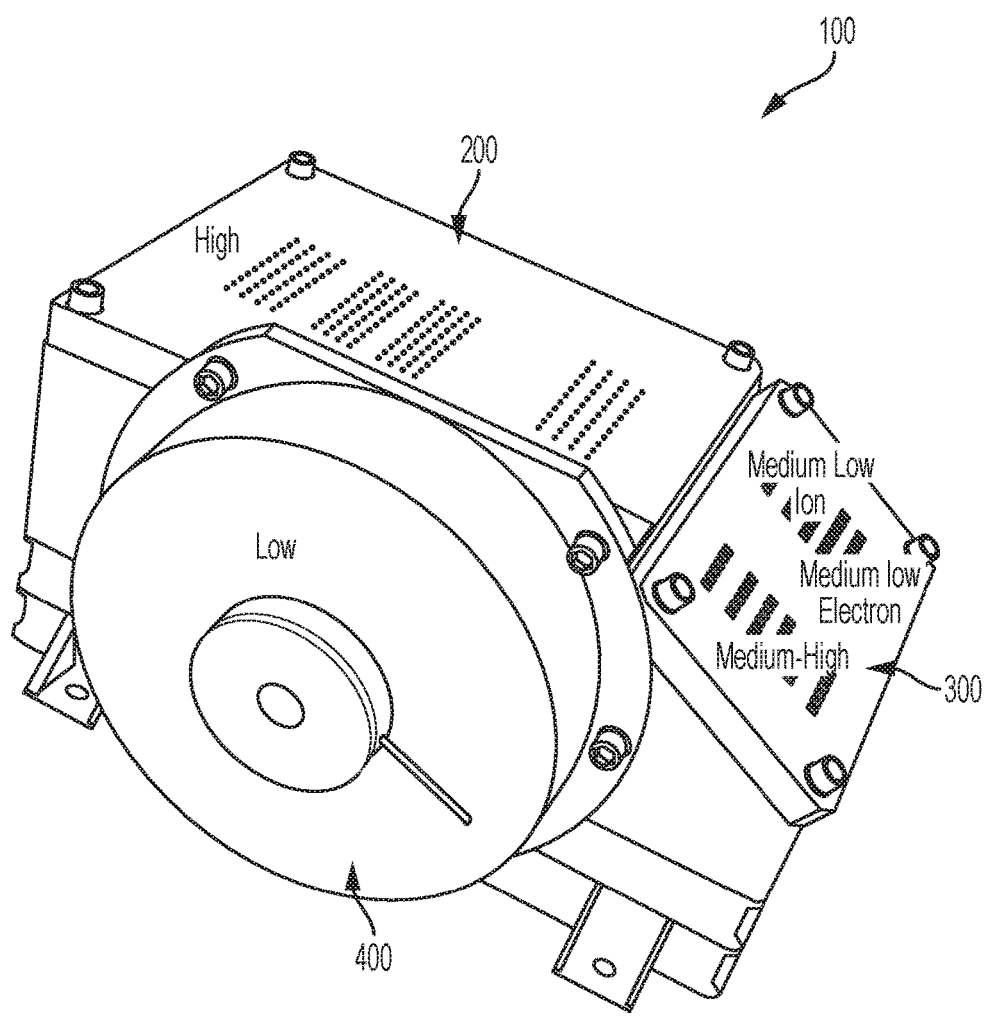
FIG. 1 illustrates an example energy sensor array according to an example embodiment of the particle sensor.

Some example embodiments now will be described more fully hereinafter with reference to the accompanying drawings, in which some, but not all example embodiments are illustrated. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

Some embodiments may provide an energy sensor or energy sensor array which is configured to determine the directionality of energetic particles or photons received by the sensor. The sensors may include a collimator with a plurality of sensor apertures aligned with different fields of view. The sensor apertures may allow energetic particles and/or photons to pass through the collimator to a detector for measurement. The detector may be segmented and each segment may be aligned with a sensor aperture or the detector may otherwise report the location of detection so that the relevant aperture can be identified. The detector segments may variously measure energetic particles or photons, such as number of interactions or receipts, energy deposited, or the like. Since the sensor apertures in the collimator are aligned with specified fields of view and a detector segment, measurement of an energetic particle or photon by a detector segment may be indicative of the directionally of the energetic particle or photon, e.g. the direction from which the energetic particle or photon is received by the energy sensor.

The collimator may be a plate or plurality of plates in which the sensor apertures are etched, drilled, or cut. The collimator may be relatively thin compared to traditional collimators, e.g. 5-20 millimeters (mm) opposed to 30-100 mm of tubular telescope collimators. Additionally, in embodiments in which the collimator is constructed of a plurality of plates, imperfections in the apertures, such as projections caused by imperfect etching, or ridges caused by alternating hole sizes may cause noise reductions in energetic particles or photons which are not aligned with the sensor aperture center channel.

In an example embodiment, an energy sensor array may be provided including a high energy sensor, e.g. 0.5-300 MeV, a medium energy sensor, e.g. 20-6000 keV, and a low energy sensor, e.g. 0.3-30 keV. The high and medium sensor array may be configured with the collimator and segmented detector configuration described above.

In an embodiment in which the energy sensor is a high energy sensor. The energy sensor may include a second thick detector for measuring a greater fraction of the total energy and/or a penetration distance of the energetic wave or photon.

In some embodiments, the energy sensor may include a second or third detector, e.g. a veto detector, configured for measuring energetic or photons which have penetrated the previous detector layer or layers. Detection of an energetic particle or photon by the veto detector may be indicative of an energetic particle or photon with sufficient energy to penetrate the collimator without passing through the sensor aperture, and therefore the indicated directionality of the energy particle or energy wave may not be useful. In some example embodiments, segmentation of the veto detector may be used to recover directional information through coincidence with detection of the energetic particle or photon on the segmented front detector.

In an example embodiment the veto detector or another detector may be disposed around the periphery of the sensor configured to detect escaping energetic particles or photons, such as from particle interactions within the detector, for example reflection or scattering interactions.

In an example embodiment, the energy sensor array may be utilized for the determination of the type and intensity of a directed energy attack. In some example embodiments the sensor array may be beneficial in the characterization of the directed energy attack.

In some embodiments, the energy sensor may include a sensor shield around the periphery of the energy sensor to limit measurement of energetic particles or photons which are not received through the collimator.

In some embodiments, the sensor apertures may be individually aligned with different fields of view. In other example embodiments, the sensor apertures may be aligned in groups with the same field of view. In still further example embodiments, the sensor apertures may be aligned in the same or divergent directions and optical fibers or particle tubes may be aligned with specific look directions and may guide the passage of energy particles or energy waves to the respective sensor apertures and thereby detector segments.

In some example embodiments, the optical fibers or particle tubes may be aligned to the specific direction by a dome or pyramid receiving structure.

In some example embodiments, a plurality of substantially flat collimators may be combined into pyramidal structures to provide a larger combined field-of-view.

Example Energy Sensor Array

An example embodiment will now be described in reference to FIG. 1, which illustrates an example energy sensor array in which an embodiment of the particle sensor may be employed. A sensor array 100 may include a high energy sensor 200, a medium energy sensor 300, and a low energy sensor 400, or any combination thereof. The high, medium, and low energy sensors may be configured to measure energy of energetic particles such as electrons, protons, neutrons, alpha, or the like, and/or energy waves, e.g. photons, such as gamma, ultraviolet, infrared, microwaves, or the like. In some example embodiments, the high energy sensor 200 may be configured to measure electrons with an energy range of about 0.8-10 MeV and protons with an energy range of about 6-300 MeV. In an example embodiment, the medium sensor array 300 may be configured to measure electrons with an energy range of about 30-800 keV and protons with an energy range of about 30-6000 keV. In an example embodiment, the low energy sensor array 400 may be configured to measure electrons with an energy range of about 0.03-30 keV and protons with an energy range of about 0.03 keV to 30 keV.

In some example embodiments, the high energy sensor 100 may be deployed for operation perpendicular to a magnetic field, such as the magnetic field of a planet, e.g. Earth. The angle of the medium energy sensor 300 relative to the high energy sensor 200 may be based on field alignment in a low Earth orbit, or may be parallel to the high energy sensor in a geo-synchronous orbit.

Figure 2:
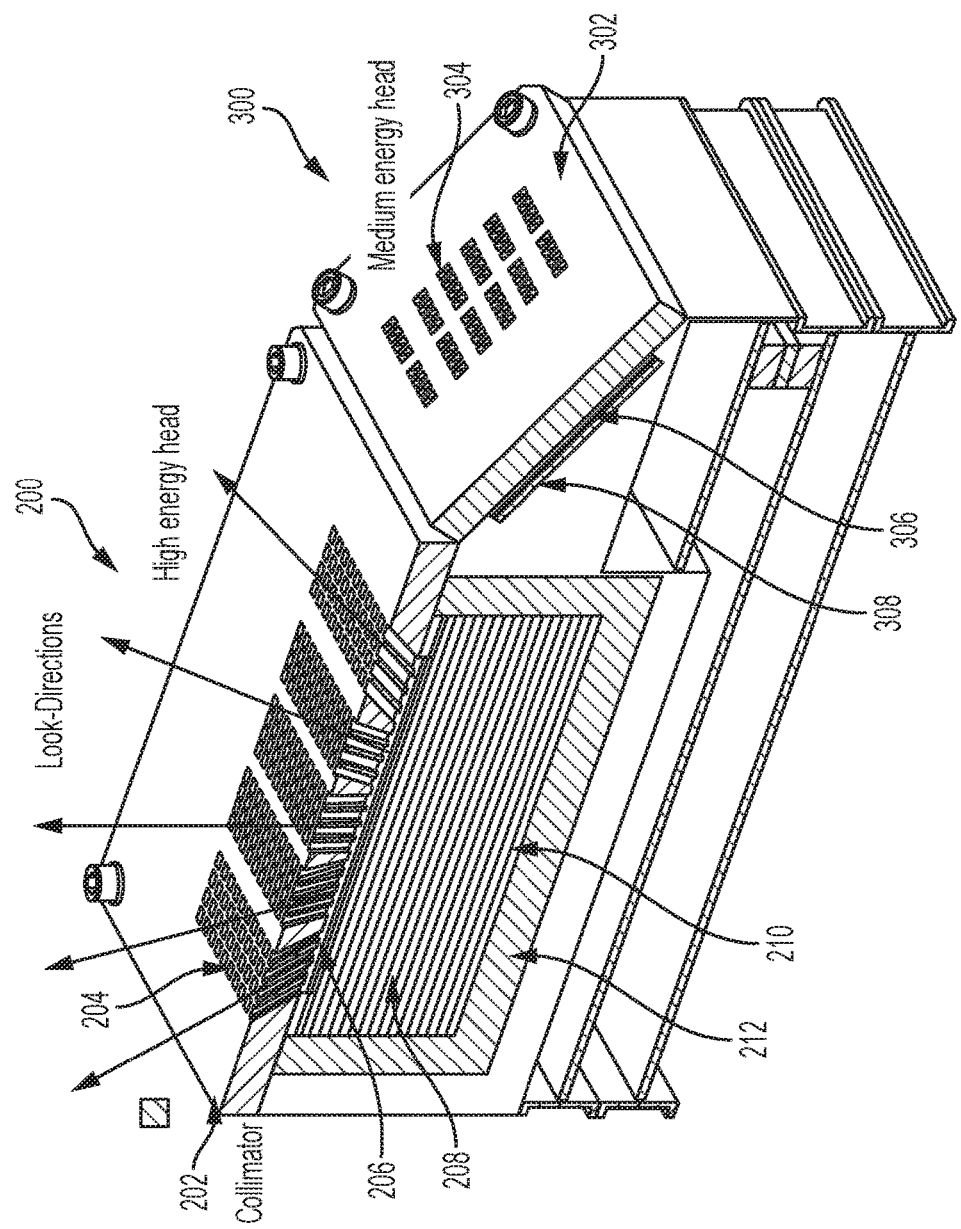
FIG. 2 illustrates a cross-sectional view of an energy sensor array according to an example embodiment of the particle sensor.

FIG. 2 illustrates a cross-sectional view of an energy sensor array according to an example embodiment. The energy sensor array may include a High energy sensor or head 200 and a low energy sensor or head 300.

The high energy sensor 200 may include a collimator 202, a thin detector 206, a thick detector 208, a veto detector 210, and a sensor shield 212. The collimator may include a plurality of sensor apertures 204. The sensor apertures 204 may be individually aligned with look directions, or fields of view. In an example embodiment, clusters or groups of sensor apertures 204 may be aligned in the same look direction. The high energy sensor 200 depicted includes sensor apertures 204 aligned in groups in five distinct look directions.

Energetic particles or photons which are aligned with the sensor aperture 204 may pass through the collimator 202 to the thin detector 206. The thin detector 206 may be segmented to measure energetic particles or photons in each segment. The thin detector 206 detector segments may be aligned with individual sensor apertures 204 or groups of sensor apertures with the same field of view or look direction. Since the thin detector 206 detector segments are aligned with sensor apertures 204, the measurements of energetic particles or photons by a particular detector segment may be indicative of a directionality of the measured energetic particle or photon.

The thick detector 208 may be a single detector or a plurality of detectors configured to measure the energy level and/or penetration distance of the energetic particle or photon.

The veto detector 210 may be provided after the thick detector 208 to measure energetic particles or photons which penetrate the thick detector. The sensor array may be configured such that energetic particles or photons which penetrate the thick detector 208 would be likely to penetrate the collimator 202 without passing through a sensor aperture 204, rendering any directionality indication of little use. The veto detector 210 may measure energetic particles or photons which satisfies a predefined nullification threshold, and therefore negate the directionality indication for the energy particle or energy wave measurement which it is associated with. In an example embodiment, segmentation of the veto detector may be used to recover directional information through coincidence with detection of the energetic particle or photon on the segmented front detector 206, as discussed below in FIG. 3.

In an example embodiment the veto detector 210 or another detector may be disposed around the periphery of the sensor 200 configured to detect escaping energetic particles or photons, such as from particle interactions within the detector, for example reflection or scattering interactions.

The detector shield 212 may be provided around the periphery of the detectors 206, 208, 210, to limit measurement of energetic particles or photons which do not pass through the collimator 202. The detector shield 212 may be aluminum, tungsten, or other suitable material based on the energy levels and types of the particles in the surrounding environment.

The medium-high energy sensor or head 300 may include a collimator 302, a first detector 306 and a second detector 308. The collimator 300 may include a plurality of sensor apertures 304, similar to the sensor apertures 204 discussed above in regards to the high energy sensor 200.

The first detector 306 may be a segmented energy detector and aligned with the sensor apertures 304, similar to the thin detector 206, discussed above.

The second detector 308 may be configured to measure the energy level and/or penetration distance of the energy particle or energy wave.

In some example embodiments the medium energy sensor may consist of three elements: Medium-high; Medium-low-electron; and Medium-low-ion, e.g. proton.

Figure 3:
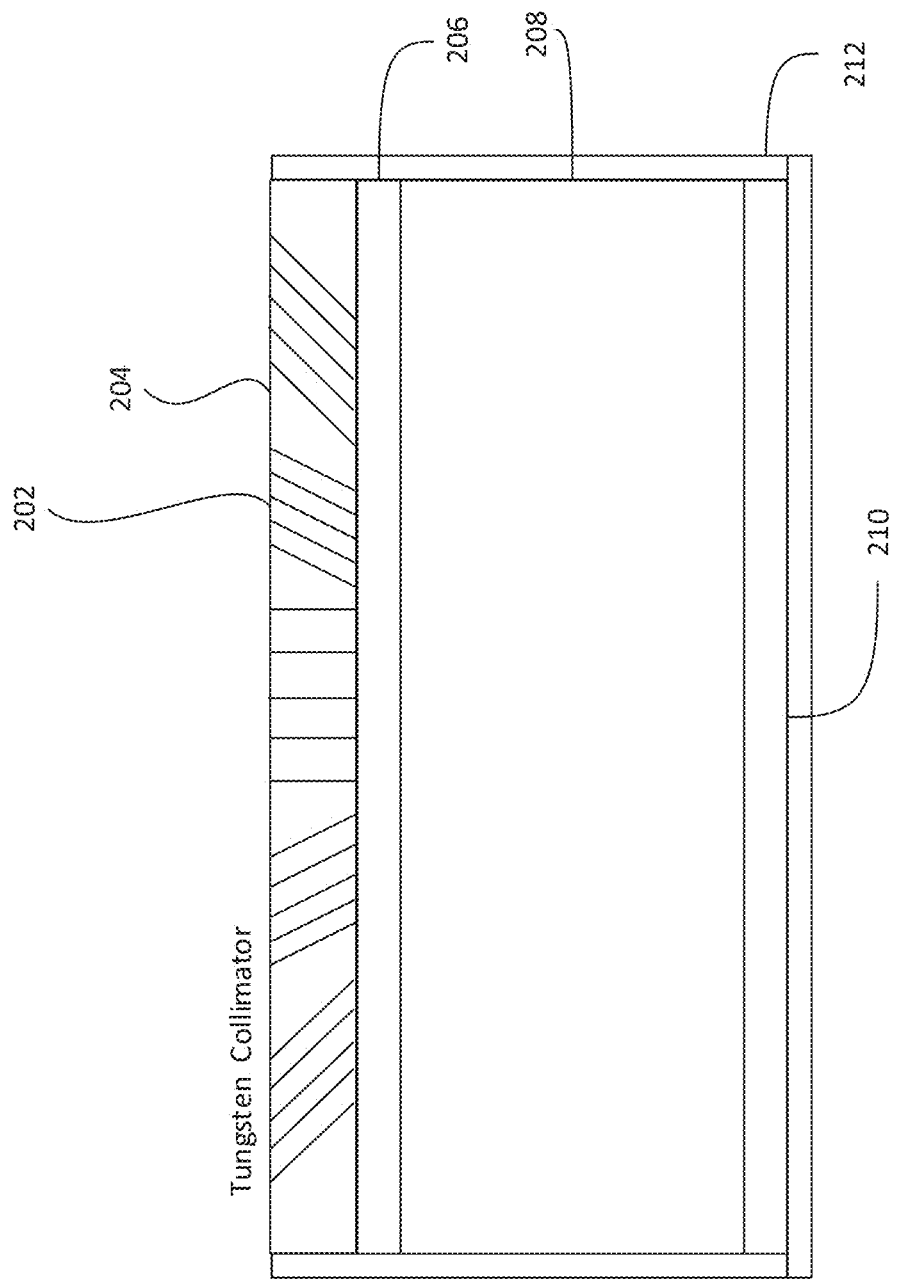
FIG. 3 illustrates an example high energy sensor according to an example embodiment of the particle sensor.

In the Medium-high energy sensor first detector 308 may be a thin detector and the second detector 308 may be a thick detector similar to the detector scheme discussed above in regard to the high energy detector 200 of FIG. 3.

In the Medium-low-electron sensor the first detector 406 and the second detector 408 may include a pair of medium thickness solid state detectors (SSDs), such as silicon strip detectors, e.g. approximately 200 µm, disposed in an anti-coincidence configuration. Flashing may be disposed on the front of the front SSD, e.g. first detector 306, of the SSD pair to prevent or limit cross species contamination, e.g. eliminate protons.

The Medium-low-ion sensor may also include the pair of medium thickness SSDs for the first detector 406 and the second detector 308 disposed in an anti-coincidence configuration. Magnets may be disposed in the collimator 302 in front of the proton detector to prevent or limit cross species contamination, e.g. eliminate electrons.

In an example embodiment in which the medium energy sensor is utilized for as a directed energy attack sensor, the first detector 306 and second sensor 308 may also include the medium thickness SSD pair, similar to the medium low-electron and medium low-ion sensor discussed above.

In some example embodiments, any or all of the medium energy sensors may also include the veto detector, as discussed below in FIG. 4.

Example High Energy Sensor

FIG. 3 illustrates an example high energy sensor according to an example embodiment. The high energy sensor may include the collimator 202, the thin detector 206, the thick detector 208, the veto detector 210, and a sensor shield 212.

The collimator 202 may be constructed of tungsten or other suitable shielding material depending on the energy level of energy particles or energy waves in a deployment environment. In an example embodiment the collimator 202 may be 5 mm thick, 8 mm thick, 1 cm thick, or any other thickness based on shielding requirements. In an example embodiment the collimator 202 may be constructed of approximately 40-60 thin, e.g. approximately 5 mil, sheets of tungsten. The collimator 202 may include a plurality of sensor apertures 204 penetrating the collimator 202. Each of the sensor apertures may be aligned with a specific field of view or look direction. In some example embodiments, groups of two or more sensor apertures 204 may be aligned to the same look direction. In an example embodiment, the sensor apertures 204 may be square 0.5-1.0 mm holes etched in each of the tungsten sheets. Varying the holes size and/or shape of the sensor apertures 204 may permit the angular resolution and geometry factor to be adjusted for the particular application of the sensor or sensor array. The sensor aperture 204 size may limit degradation or destruction of the energy particle or energy wave, for example the sensor aperture may be sufficient to allow passage of an aligned energetic particle or photon without collision with the channel walls by energy wave peaks.

The thin detector 206 may be a segmented detector as discussed above in FIG. 2 and below in FIG. 5B. The thin detector may be a solid state detector, such as a SSD, or the like. In an instance in which the thin detector 206 is a SSD the thin detector may be about 60-120 µm thick. The detector segments of the thin detector 206 may be aligned with the sensor apertures 204, such that a measurement of an energetic particle or photon at a detector segment is indicative of the directionality of the energetic particle or photon.

The thick detector 208 may be a single detector or a stack of detector elements, such as closely stacked SSDs. The thick detector 208 may be configured to capture and measure the energy level and/or penetration distance of most energetic particles or photons which penetrate the thick detector. In an example embodiment, the thick detector 208 may be about 25 mm thick.

The veto detector 210 may be provided after the thick detector 208. The veto detector 210 may be an SSD, or the like, configured to measure energetic particles or photons with sufficient energy to satisfy a predetermined nullification threshold, e.g. >60-70 MeV. Energetic particles or photons with energy sufficient to penetrate the thick detector 208 and be measured by the veto detector 210 may be likely to have sufficient energy to penetrate the collimator 202 without passing through a sensor aperture 204. In an example embodiment, the measurement of an energetic particle or photon by the veto detector 210 may negate the directionality indicted by the thin detector 206 measurement of the energetic particle or photon.

In some example embodiments, the veto detector 210 may be segmented. Coincidences between measurements of an energetic particle or photon by a segment of the thin detector 201 and a segment of the veto detector 210 may be indicative of directionality of the energetic particles or photons which penetrate to the veto detector.

The sensor shield 212, or anti-coincidence shield, may be a graded shield. In one example embodiment, the sensor shielding may include an approximately 1 cm tungsten inner layer and an approximately 3.5 cm aluminum layer. The sensor shield 212 may be any shielding material or materials which may limit energetic particles or photons entering the sensor without passing through the collimator 202.

The depicted example embodiment of the high energy sensor may be approximately 10 cm wide and measure electrons with an energy range of 1-10 MeV and protons with an energy range of 5-300 MeV. The high energy sensor may have sensor apertures 204 aligned in 5 distinct look directions, each with approximately 18×18 degree fields of view, comprising a total 110×18 degree field of view.

Example Medium Energy Sensor

Figure 4:
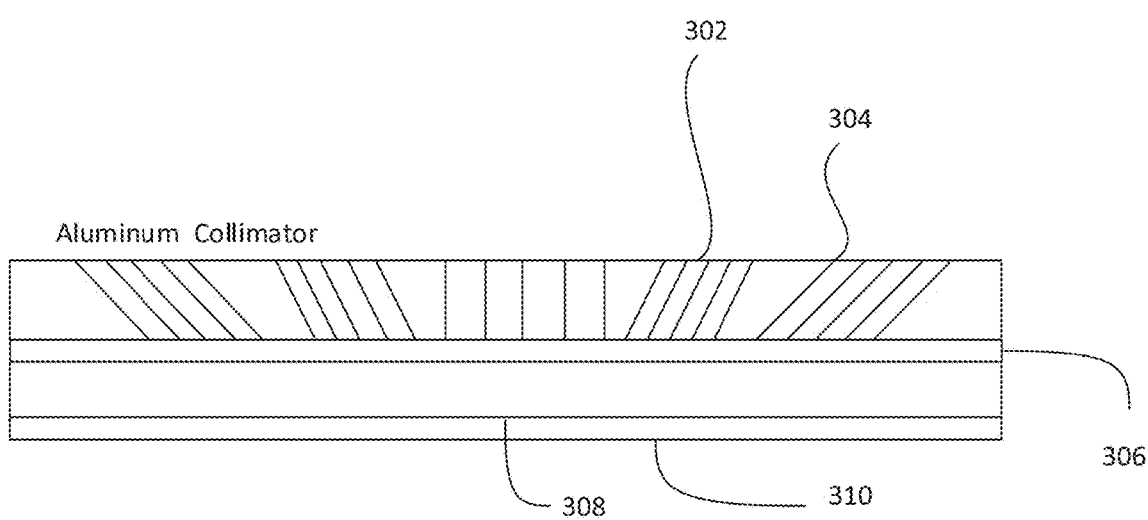
FIG. 4 illustrates an example medium energy sensor according to an example embodiment of the particle sensor.

FIG. 4 illustrates an example medium energy sensor according to an example embodiment. The medium energy sensor may include the collimator 302, the thin detector 306, and the thick detector 308.

The collimator 302 may be constructed of aluminum or other suitable shielding material depending on the energy level of energetic particles or photons in a deployment environment. In an example embodiment, the collimator may be 8 mm thick, or any other thickness based on shielding requirements. The collimator 302 may include a plurality of sensor apertures 304 penetrating the collimator. Each of the sensor apertures 304 may be aligned with a specific field of view or look direction. In some example embodiments, groups of two or more sensor apertures may be aligned to the same look direction.

The thin detector 306 may be an SSD, or the like. In an example embodiment the thin detector may be 10 µm thick. The thin detector 306 may be segmented as discussed above. Each segment of the thin detector 306 may be aligned with one or more sensor apertures 304 aligned with a specific look direction or field of view. Measurement of an energetic particle or photon at a detector segment may be indicative of the directionality of the energetic particle or photon.

The thick detector 308 may be an SSD, or the like. In an example embodiment, the thick detector 308 may be 500 µm thick. The thick detector 308 may be configured to measure the energy level and/or penetration distance of an energetic particle or photon.

In an example embodiment, the medium energy sensor may also include a veto sensor 310. The veto detector 310 may be provided after the thick detector 308. The veto detector 310 may be an SSD, or the like, configured to measure energetic particles or photons with sufficient energy to satisfy a predetermined nullification threshold, e.g. >10 MeV.

In an example embodiment, energetic particles or photons with energy sufficient to penetrate the thick sensor 308 and be measured by the veto detector 310 may be likely to have sufficient energy to penetrate the collimator 302 without passing through a sensor aperture 304. In an example embodiment, the measurement of an energetic particle or photon by the veto detector 310 may negate the directionality indicted by the thin detector 306 measurement of the energetic particle or photon.

In an additional or alternative embodiment of the high energy sensor 200, discussed in FIG. 3 or the medium energy sensor 300, discussed in FIG. 4, implemented as an directed energy attack sensor, the detector 306, 406, 308, 408 may be a microchannel (MC) plate or charged coupled device (CCD).

Example Collimator Configurations

Figure 5A:
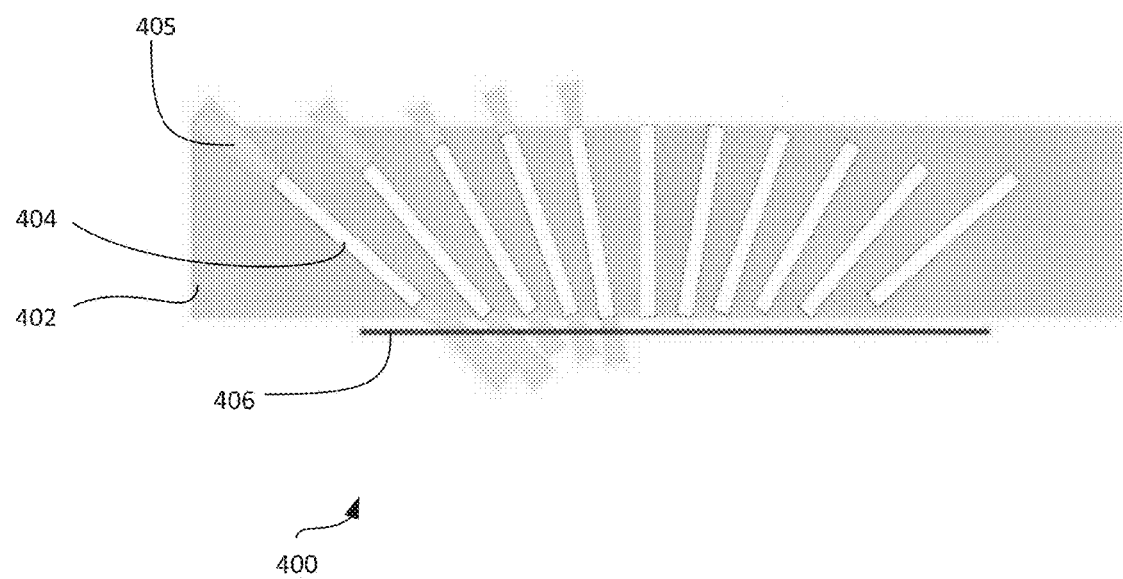

FIGS. 5A-5D illustrate example collimator configurations according to an example embodiment. FIG. 5A illustrates an energy sensor 400 including a collimator 402 and a thin detector 406. The collimator 402 includes a row of holes 404, or sensor apertures which are aligned in different directions, e.g. look directions. The middle sensor aperture 404 row is directed relatively straight through the collimator 402, each pair of sensor apertures rows on either side of the middle aperture is canted relative to the middle row. Energy directed toward, or originating from within the field of view of, the respective sensor aperture 404 may register at a location behind the sensor aperture on the detector 406. The strength of the signal, may be indicative of the strength or intensity of the directed energy. The size and shape of the sensor aperture 404 may be chosen to allow passage of an energetic particle or photon to the sensor 406, which is within the sensor's 400 dynamic range for anticipated directed energy intensities. Directed energy intensity may be reduced, in some embodiments, by an intervening moderating material, such as foil, for example, an aluminum foil sheet may be displaced between the collimator 402 and the thin sensor 406 to limit or eliminate low energy particles. Directed energy intensity may also be reduced, in some embodiments, by bending the aperture near the detector so as to require some reflection to occur before the signal reaches the detector.

The sensor apertures 404 may be similar or nearly identical in geometric factors, size, and shape for each look direction. This may be achieved in one example embodiment by providing identical or nearly identical sensor aperture guide holes 404, such as rectangular profile holes, with any blocking material 405 removed in front or behind the guide holes from the collimator 402.

FIG. 5B illustrates a sensor 400 including a collimator 402 and a thin sensor 406. The collimator 402 may include a plurality of sensor apertures 404 aligned with different look directions. The thin detector 406 may be segmented into detector segments 406A. Each of the sensor apertures 404 may be aligned with a detector segment 406A. Measurement of an energetic particle or photon at an detector segment 406A may be indicative of the look direction of the respective sensor aperture 404.

Additionally or alternatively, three or more sensors 400 may be configured in a pyramid shape to provide a larger combined field-of-view.

FIG. 5C illustrates an example embodiment of a sensor 400 including a collimator 402, a thin detector 406, optical fiber 422, and a receiver 420. The collimator may include a plurality of sensor apertures 404 aligned with respective detector segments 406A of the thin detector 406. The sensor apertures 404 may be parallel to each other or divergent. The optical fibers 422 may include a receiving end and discharge end. The receiving end of the optical fibers 422 may be aligned with respective sensor apertures 404. The receiving end of the optical fibers may be aligned with various look directions or fields of view. The receiver 420, such as the receiver dome depicted, may align the optical fibers in the respective look directions. The collimator 402 may provide shielding for the sensor and assist the passage of the energetic particles or photons to the appropriate detector segments 406A. The optical fibers 422 may guide a photon from the receiving end to the discharge end to a sensor aperture 404. In an alternative embodiment, the receiver 420 may be disposed above the thin detector 406 without collimator 402. In a further example embodiment, the collimator 402 may be disposed on the exterior surface of the receiver 420, the receiving end of the optical fibers may be aligned with the sensor apertures 404 of the collimator and the discharge end may be aligned with respective detector segments 406A.

FIG. 5D illustrates an example embodiment of a sensor 400 including a collimator 402, a detector 406, optical fiber 422, and a receiver 420. The collimator may include a plurality of sensor apertures 404 aligned with respective detector segments 406A of the detector 406. The sensor apertures 404 may be parallel to each other or divergent. The collimator 402 may or may not be present. The optical fibers 422 may include a receiving end and discharge end. The receiving end of the optical fibers 422 may be aligned with respective sensor apertures 404. The receiving end of the optical fibers may be aligned with various look directions or fields of view. The receiver 420, such as the pyramid receiver depicted, may align the optical fibers in the respective look directions. The collimator 402 may provide shielding for the sensor and assist the passage of the energetic particles or photons to the appropriate detector segments 406A. The optical fibers 422 may guide a photon from the receiving end to the discharge end to a sensor aperture 404. In an alternative embodiment, the receiver may be disposed above the thin detector 406 without collimator 402. In a further example embodiment, the collimator 402 may be disposed on the exterior surface of the receiver 420, the receiving end of the optical fibers may be aligned with the sensor apertures 404 of the collimator and the discharge end may be aligned with respective detector segments 406A.

Additionally or alternatively, particle tubes, such as nanotubes, light tubes or other guide tubes, may be used in place of the optical fibers discussed in FIGS. 5C and 5D to guide photons or energetic particles.

In some example embodiments, a plurality of sensors with substantially flat collimators may be arranged into pyramidal structures to provide a larger combined field-of-view.

Figure 6B:
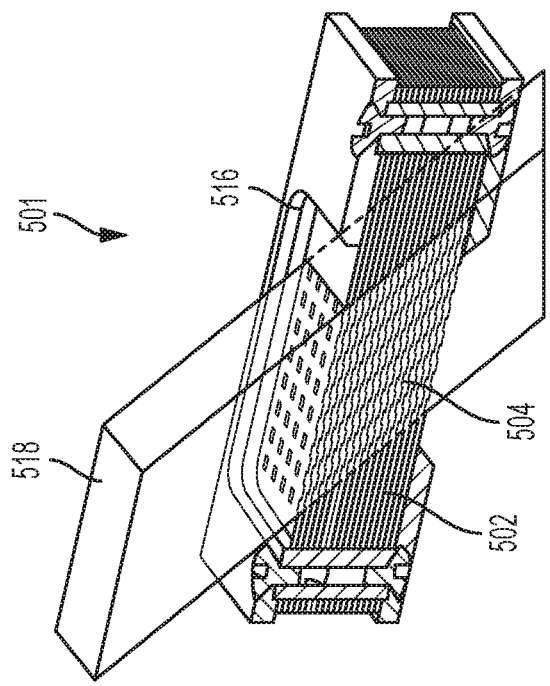
FIGS. 6A-6D illustrate example collimator construction according to an example embodiment of the particle sensor.
Figure 6A:
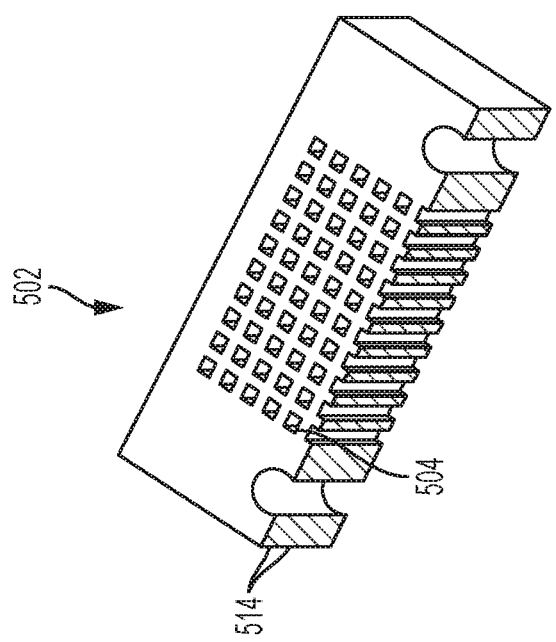

FIGS. 6A-6D illustrate example collimator construction according to an example embodiment. FIG. 6A illustrates an example collimator 502 including a plurality of collimator plates 514. The collimator plates 502 may include sensor apertures 504 etched, drilled, cut, or otherwise penetrating the collimator plates. The collimator plates 514 may be stacked aligning the sensor apertures 504. The collimator plates 514 may be retained in alignment by a retainer, such as screws, nails, welding, bracket, frame, or the like.

FIG. 6B illustrates a sensor 501 including a sensor face 516, and collimator 502. The sensor face 516 may include an aperture configure to allow unrestricted penetration of energetic particles or photons to the collimator 502 of the sensor. The collimator 502 may include collimator plates, similar to the collimator plates 514 of FIG. 6A, wherein the sensor apertures of each plate may be offset to form a sensor aperture with an angled look direction when stacked. As depicted, an energetic particle or photon 518 may pass through the sensor face 516 and through the sensor aperture 504 of the collimator 502 at the look direction of the sensor aperture.

Figure 6D:
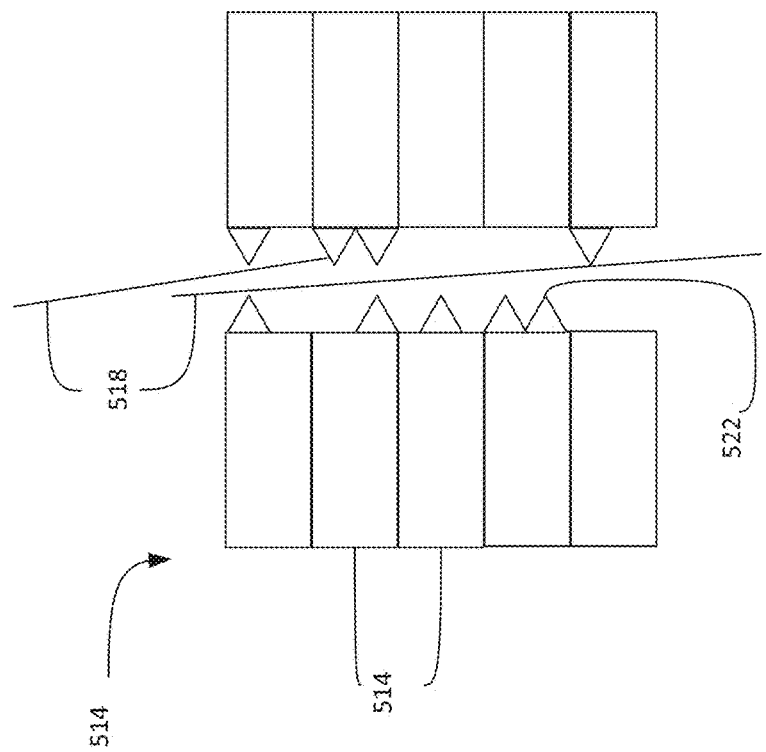
Figure 6C:
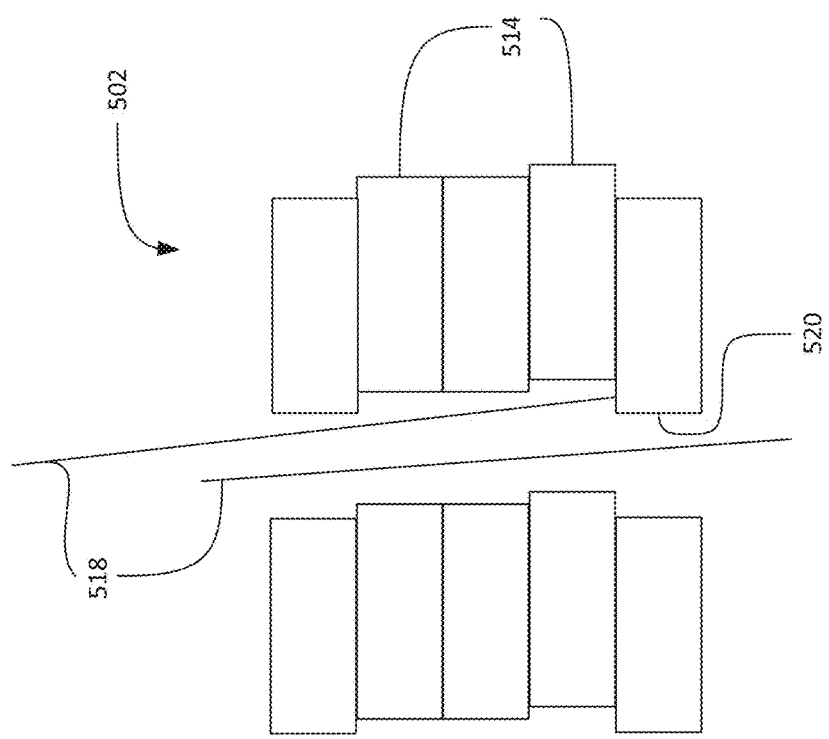

FIG. 6C illustrates a collimator 502 including collimator plates 514 stacked as described above. The collimator plates 514 may not be perfectly aligned, or may have alternating aperture size, creating ridges 520 on the sensor aperture 504 walls. The ridges 520 may be beneficial for noise reduction of energetic particles or photons 518 which are not aligned with the sensor aperture 504 channel center. Energetic particles or photons 518 which are not aligned with the sensor aperture 504 channel center may interact with the ridge 520 and not penetrate to the detector, thereby providing a cleaner direction and energy level measurement.

FIG. 6D illustrates a collimator 502 including collimator plates 514 stacked as described above. The collimator plates 514 may not be have perfectly drilled or cut sensor apertures resulting in protrusions 522 on the sensor aperture 504 walls. The protrusions 522 may be beneficial for noise reduction of energetic particles of photons 518 which are not aligned with the sensor aperture 504 channel center. Energetic particles or photons 518 which are not aligned with the sensor aperture 504 channel center may interact with the protrusions 522 and not penetrate to the detector, thereby providing a cleaner direction and energy level measurement.

FIG. 7A illustrates an example collimator and sensor aperture construction of a high energy sensor according to an example embodiment. FIG. 7A illustrates a collimator 602 of approximately 8 mm in thickness, including sensor apertures 604 in 5 distinct look directions (only the right 3 look directions are depicted for clarity). The field of view of respective sensor apertures 604 is depicted by the crossing penetrating lines. A foil layer 603, such as aluminum may be disposed between the collimator 602 and the thin sensor 606, configured to stop or limit penetration of low energy particles. In some embodiments the foil layer 603 may be in contact with the collimator.

FIGS. 7B-7C illustrate example collimator and sensor aperture construction of a medium energy sensor according to an example embodiment. FIG. 7B illustrates a longitudinal cross section of the collimator of approximately 45 mm in length. The sensor apertures are approximately 2.1 mm wide, approximately 8 mm deep, 0.7 mm separation and a generally rectangular shape.

FIG. 7C illustrates a transverse cross-section of the medium energy collimator similar to the collimator depicted in FIG. 7B.

Example Energy Sensor Simulation Results

FIG. 8 illustrates example results of collimator simulations according to an example embodiment. Table 1 summarizes the simulation results; the angular dependence is shown at the top for the spectral performances of the two different configurations. The designs for the test collimators may be substantially similar to those depicted in FIGS. 6A and 6B.

TABLE 1

| Hole Size | 1 MeV | 5 MeV | 10 MeV |
|---|---|---|---|
| 0.5 mm | 8° | 10° | 12° |
| 1.0 mm | 14° | 17° | 21° |

Lines 801 indicate the spectrum of transmitted electrons which result from 10 MeV beams for the two configurations.

Figure 9:
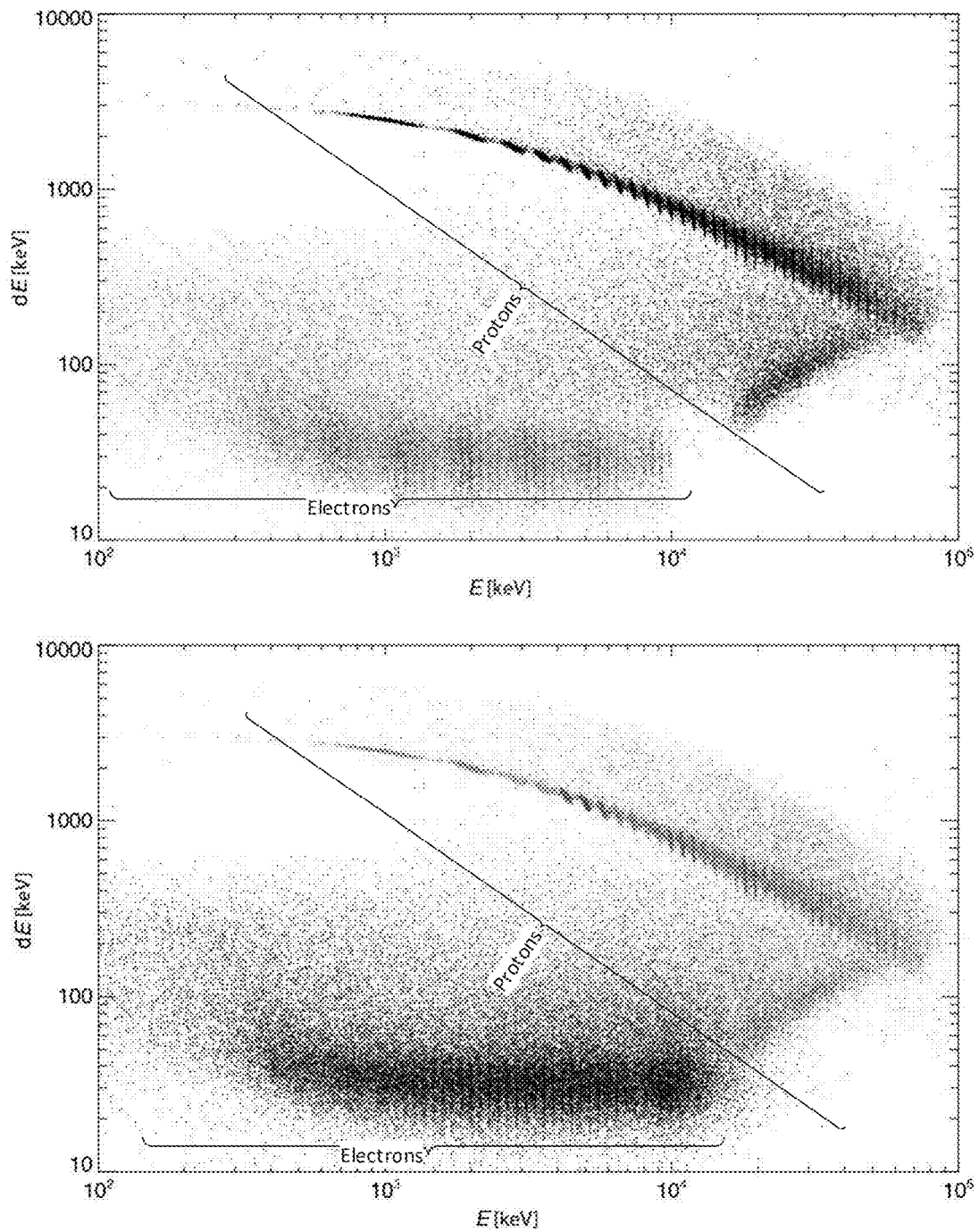
FIG. 9 illustrates example simulated particle hits on a high energy sensor according to an example embodiment of the particle sensor.

FIG. 9 illustrates example simulated particle hits on a high energy sensor according to an example embodiment. The simulation results demonstrate a separation of isotropic electrons and protons in designated energy ranges and incident on a nominal collimator. In the upper graph protons are represented through 300 MeV and electrons through 10 MeV. In the lower graph protons are depicted through 300 MeV and electrons through 95 MeV.

Figure 10:
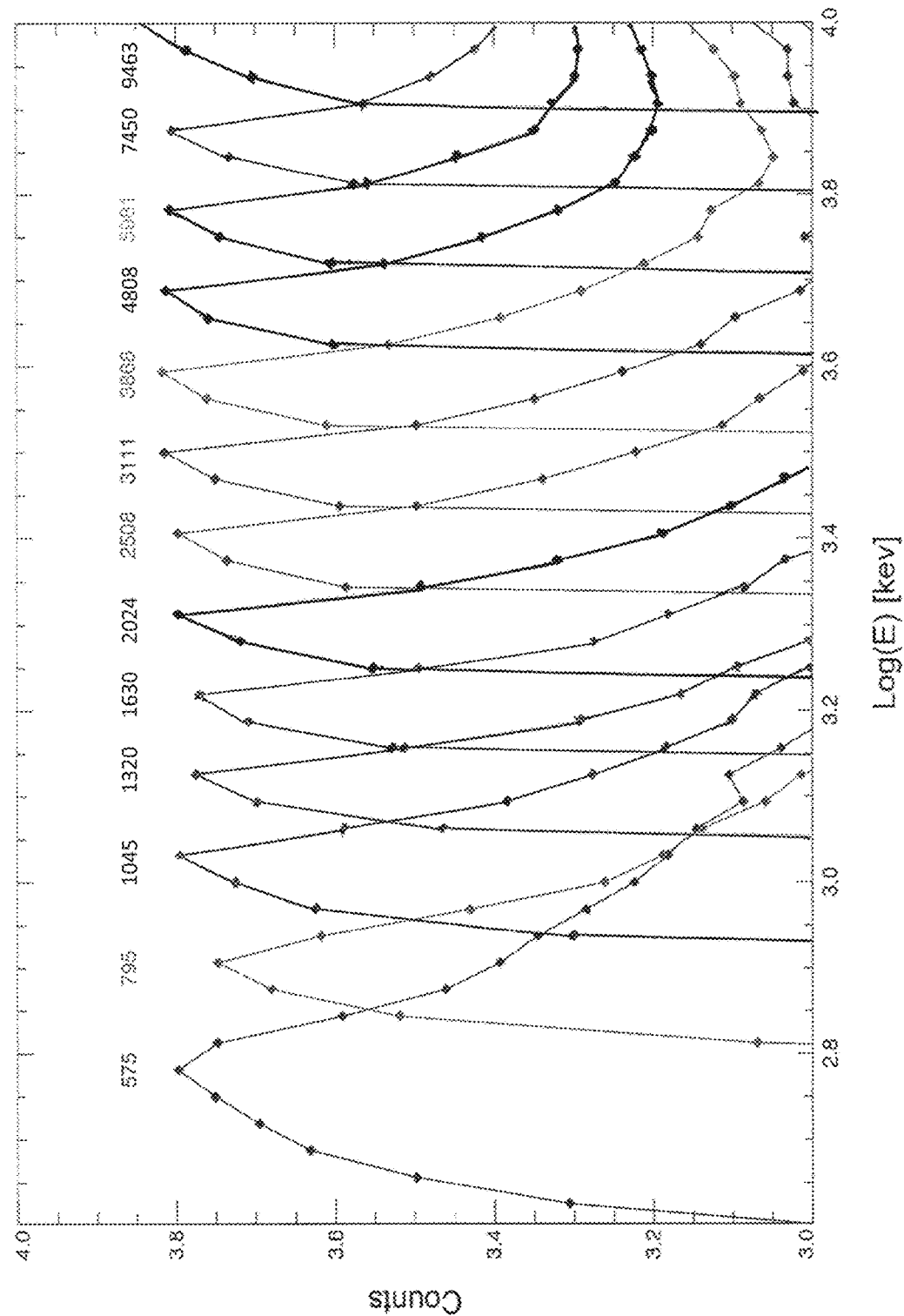
FIG. 10 illustrates an example GEANT (geometry and tracking) simulation according to an example embodiment of the particle sensor.

FIG. 10 illustrates an example GEANT (geometry and tracking) simulation according to an example embodiment. The graph represents a GEANT simulation of possible channelization of a high energy sensor for electrons. The numbers over each peak indicate the energy in keV. The dots on each peak represent 7% incident energy spacing. The graph depicts 13 well distinguished energy channels.

In some embodiments, the energy sensor may be further configured for optional modifications. In this regard, for example the energy sensor may include a second energy detector configured to measure the energetic particle or photon. The measuring the energetic particle or photon at the second energy detector is indicative of the energetic particle or photon having an energy satisfying a predetermined nullification threshold. In some example embodiments of the energy sensor, satisfaction of the predetermined nullification threshold by the energetic particle or photon is indicative of the energetic particle or photon having sufficient energy to negate a directionality applied by the collimator. In an example embodiment of the energy sensor, the second energy detector is segmented and coincidence between the detector segment of the first energy sensor which measures the energetic particle or photon and a detector segment of the second energy detector which measures the energetic particle or photon is indicative of the directionality of the energetic particle or photon. In some example embodiments, the energy sensor also includes a third energy detector disposed between the first energy detector and the second energy detector configured to measure an energy level of the energetic particle or photon. In an example embodiment of the energy sensor, the collimator comprises a plurality of plates. In some example embodiments, of the energy sensor, the sensor apertures further comprise one or more ridges or projections. In an example embodiment, the energy sensor also includes a shield configured to absorb at least a portion of energetic particles or photons which do not pass through a sensor aperture. In some example embodiments of the energy sensor, the sensor aperture size limits at least in part degradation or destruction of the energetic particle or photon. In an example embodiment, the energy sensor also includes a receiving dome configured to align the optical fibers or particle tubes in the plurality of directions. In some example embodiments, the energy sensor also includes a receiving pyramid configured to align the optical fibers or particle tubes in the plurality of directions. In an example embodiment, the sensor array may also include a low energy sensor.

Many modifications and other embodiments of the particle sensors set forth herein will come to mind to one having the benefit of the teachings presented in the foregoing descriptions and the associated drawings. Therefore, it is to be understood that the claimed inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An energy sensor comprising:
   a collimator comprising a plurality of sensor apertures aligned in a plurality of directions configured to allow passage of an energetic particle or photon in a specific direction for respective apertures of the plurality of sensor apertures;
   a first energy detector configured to measure the energetic particle or photon comprising a plurality of detector segments, wherein respective detector segments of the plurality of detector segments are aligned with the respective sensor apertures and a detector segment which measures the energetic particle or photon is indicative of a directionality of the energetic particle or photon; and
   a second energy detector configured to measure the energetic particle or photon, wherein measuring the energetic particle or photon at the second energy detector is indicative of the energetic particle or photon having an energy satisfying a predetermined nullification threshold, wherein satisfaction of the predetermined nullification threshold by the energetic particle or photon is indicative of the energetic particle or photon having sufficient energy to negate a directionality applied by the collimator.

2. The energy sensor of claim 1, wherein the second energy detector is segmented and coincidence between the detector segment of the first energy detector which measures the energetic particle or photon and a detector segment of the second energy detector which measures the energetic particle or photon is indicative of the directionality of the energetic particle or photon.

3. The energy sensor of claim 1 further comprising:
a third energy detector disposed between the first energy detector and the second energy detector configured to measure an energy level of the energetic particle or photon.

4. The energy sensor of claim 1, wherein the collimator comprises a plurality of plates.

5. The energy sensor of claim 1, wherein the sensor apertures further comprise one or more ridges or projections.

6. The energy sensor of claim 1 further comprising:
a shield configured to absorb at least a portion of energetic particles or photons which do not pass through a sensor aperture.

7. The energy sensor of claim 1, wherein the sensor aperture size limits at least in part degradation or destruction of the energetic particle or photon.

8. An energy sensor comprising:
a plurality of optical fibers or particle tubes configured to guide passage of an energetic particle or photon from a receiving end to a discharge end, wherein respective receiving ends of respective optical fibers or particle tubes of the plurality of optical fibers or particle tubes are aligned in a plurality of directions;
a collimator comprising a plurality of sensor apertures configured to allow passage of the energetic particle or photon, wherein a respective discharge ends of the respective optical fibers or particle tubes are aligned with respective sensor apertures;
a first energy detector configured to measure the energetic particle or photon comprising a plurality of detector segments, wherein respective detector segments of the plurality of detector segments are aligned with the respective sensor apertures and a detector segment which measures the energetic particle or photon is indicative of a directionality of the energetic particle or photon; and
a second energy detector configured to measure the energetic particle or photon, wherein measuring the energetic particle or photon at the second energy detector is indicative of the energetic particle or photon having an energy satisfying a predetermined nullification threshold, wherein satisfaction of the predetermined nullification threshold by the energetic particle or photon is indicative of the energetic particle or photon having sufficient energy to negate a directionality applied by the collimator.

9. The energy sensor of claim 8 further comprising:
a receiving dome configured to align the optical fibers or particle tubes in the plurality of directions.

10. The energy sensor of claim 8 further comprising:
a receiving pyramid configured to align the optical fibers or particle tubes in the plurality of directions.

11. The energy sensor of claim 8 further comprising:
a third energy detector disposed between the first energy detector and the second energy detector configured to measure an energy level of the energetic particle or photon.

12. The energy sensor of claim 8, wherein the collimator comprises a plurality of plates.

13. The energy sensor of claim 8 further comprising:
a shield configured to absorb at least a portion of energetic particles or photons which do not pass through a sensor aperture.

14. The energy sensor of claim 8, wherein the sensor aperture size limits at least in part the degradation or destruction of the energetic particle or photon.

15. An energy sensor array comprising: a high energy sensor comprising:
a collimator comprising a plurality of sensor apertures aligned in a plurality of directions configured to allow passage of an energetic particle or photon in a specific direction for respective apertures of the plurality of sensor apertures;
a first energy detector configured measure the energetic particle or photon comprising a plurality of detector segments, wherein respective detector segments of the plurality of detector segments are aligned with the respective sensor apertures and the respective detector segment which measures the energetic particle or photon is indicative of a directionality of the energy particle or wave;
a second energy detector configured to measure the energetic particle or photon, wherein measuring the energetic particle or photon at the second energy detector is indicative of the energetic particle or photon having an energy satisfying a predetermined nullification threshold wherein satisfaction of the predetermined nullification threshold by the energetic particle or photon is indicative of the energetic particle or photon having sufficient energy to negate a directionality applied by the collimator; and
a third energy detector disposed between the first energy detector and the second energy detector configured to measure an energy level of the energetic particle or photon; and
a medium energy sensor comprising
a second collimator comprising a second plurality of sensor apertures aligned in a second plurality of directions configured to allow passage of a second energetic particle or second photon in a second specific direction for respective apertures of the second plurality of sensor apertures;
a fourth energy detector configured to measure the second energetic particle or second photon comprising a second plurality of detector segments, wherein respective detector segments of the second plurality of detector segments are aligned with the respective second sensor apertures and the respective second detector segment which measures the second energetic particle or second photon is indicative of a second directionality of the second energetic particle or second photon; and
a fifth energy detector configured to measure the second energetic particle or second photon, wherein measuring the second energetic particle or second photon at the fifth energy detector is indicative of the second energetic particle or second photon having an energy satisfying a second predetermined nullification threshold.

16. The energy sensor array of claim 15 further comprises:
a low energy sensor.

* * * * *